United States Patent [19]
Osgood

[11] Patent Number: 6,144,440
[45] Date of Patent: *Nov. 7, 2000

[54] COLOR AND MOTION BASED DEPTH EFFECTS

[75] Inventor: Alan George Osgood, Redmond, Wash.

[73] Assignee: Evergreen Innovations

[ * ] Notice: This patent is subject to a terminal disclaimer.

[21] Appl. No.: 09/270,993

[22] Filed: Mar. 17, 1999

[51] Int. Cl.[7] .................................................. G03B 21/32
[52] U.S. Cl. ................................. 352/86; 352/43
[58] Field of Search ................... 352/43, 57, 60, 352/86; 359/464, 478; 348/42, 60; 353/10

[56] References Cited

U.S. PATENT DOCUMENTS

| | | |
|---|---|---|
| 3,445,153 | 5/1969 | Marks et al. . |
| 4,131,342 | 12/1978 | Dudley . |
| 4,705,371 | 11/1987 | Beard . |
| 4,836,647 | 6/1989 | Beard . |
| 4,893,898 | 1/1990 | Beard ........................................ 359/464 |
| 5,243,460 | 9/1993 | Kornberg ................................ 359/464 |
| 5,650,815 | 7/1997 | Dasso ........................................ 348/42 |
| 5,717,415 | 2/1998 | Iue et al. ..................................... 345/8 |
| 5,751,397 | 5/1998 | Osgood . |

Primary Examiner—Russell Adams
Assistant Examiner—Rodney Fuller

[57] ABSTRACT

The current invention discloses methods for using laterally moving objects and laterally moving backgrounds in colored live scenes to create the perception of depth when scenes are viewed with viewer glasses having lens or filters of two different colors. The invention also discloses methods for using laterally moving objects and laterally moving backgrounds in colored imagery to create the perception of depth when the imagery is viewed with viewer glasses having lens or filters of two different colors. In a further aspect, the invention discloses colored imagery comprising laterally moving objects and laterally moving backgrounds to create the perception of depth when the imagery is viewed with viewer glasses having lens or filters of two different colors. In a still further aspect, the current invention relates to processes for operating a data processor with a visual display to generate colored imagery on the display with laterally moving objects and laterally moving backgrounds to create the perception of depth when the display is viewed with viewer glasses having colored lens or filters. The methods may be used for live scenes such as stage productions, motion picture films, video tapes and other types of media. The imagery can be displayed on movie screens, video displays (television, computer displays, video games, etc.) and other types of devices. The computer processes can be used with computer screen savers, video games, and other types of systems that generate imagery in real time.

7 Claims, 4 Drawing Sheets

COLOR AND MOTION BASED DEPTH EFFECTS

CROSS-REFERENCE TO RELATED APPLICATION

This application is related to application Ser. No. 08/483,564, filed Jun. 6, 1995, entitled "COLOR MOTION DEPTH EFFECT", now U.S. Pat. No. 5,751,397, issued May 12, 1998.

BACKGROUND

1. Field of the Invention

The current invention relates generally to methods for using laterally moving objects and laterally moving backgrounds to create the perception of depth when the laterally moving objects and laterally moving backgrounds are viewed with viewer glasses having colored lens or filters. The filter for the left eye is of a different color than the filter for the right eye. In a first aspect, the current invention relates to methods for using laterally moving objects and laterally moving backgrounds in live scenes to create the perception of depth when the scenes are viewed with viewer glasses having colored lens or filters. In a second aspect, the current invention relates to methods for using laterally moving objects and laterally moving backgrounds in colored imagery to create the perception of depth when the imagery is viewed with viewer glasses having colored lens or filters. In a third aspect, the current invention relates to colored imagery comprising laterally moving objects and laterally moving backgrounds to create the perception of depth when the imagery is viewed with viewer glasses having colored lens or filters. In a fourth aspect, the current invention relates to computer processes for operating a data processor with a visual display to create the perception of visual depth when the visual display is viewed with viewer glasses having colored lens or filters. The data processor generates colored imagery comprising laterally moving objects and laterally moving backgrounds on the visual display to create the perception of depth.

The methods may be used for live scenes such as stage productions, motion picture films, video tapes and other types of media. The imagery can be displayed on movie screens, video displays (television, computer displays, video games, etc.) and other types of devices. The computer processes can be used with computer screen savers, video games, and other types of systems that generate imagery in real time.

2. Prior Art

The prior art includes methods and devices to use laterally moving objects to create the perception of depth in two-dimensional motion picture films and video displays. These methods and devices are based on the Pulfrich Effect. This effect is produced by viewing laterally moving objects which appear brighter to one eye than the other eye. The basic Pulfrich Effect is commonly produced by placing a dark lens or filter over one eye. Objects that move laterally in one direction appear to be farther away from the observer. Conversely, objects that move laterally in the opposite direction appear to be closer to the observer. The basic Pulfrich Effect is a uni-directional motion sensitive depth effect. The relationship between the direction of movement and the perception of depth is dependent upon which eye is covered by the dark lens. When the right eye is covered by the dark lens, objects moving left to right from the observer's perspective appear to be closer. Objects moving right to left appear to be farther away. When the left eye is covered by the dark lens, objects moving left to right appear to be farther away. Objects moving right to left appear to be closer. These methods and devices have been the subject of various patents.

The apparatus used to produce the basic Pulfrich Effect tends to cause an undesirable side effect. The eye covered by the dark lens receives substantially less light than the other eye. This produces the sensation that one eye is dead or not working. This dead eye effect becomes irritating to observers over time.

U.S. Pat. No. 3,445,153 to Marks is based on the basic Pulfrich Effect. Observers wear special lenses. The lens over one eye reduces the light normally received by the cones (photopic vision).

Dudley discloses in U.S. Pat. No. 4,131,342 a method of combining the basic Pulfrich Effect with a chromostereoscopic effect. The chromostereoscopic effect is based on the finding that objects of colors towards the red end of the visual spectrum appear closer than objects of colors towards the blue end of the spectrum. The chromostereoscopic effect is very weak. It also restricts the use of colors in objects and backgrounds. U.S. Pat. No. 4,131,342 teaches that the basic Pulfrich Effect is due to a "differential visual time-lag" whereby the human visual system processes a brighter image faster than a dimmer image. Therefore the position of moving objects appears to be different for the eye receiving the brighter image than for the eye receiving the dimmer image. The position of moving objects appears to be more advanced for the eye receiving the brighter image than for the eye receiving the dimmer image. This eye to eye difference in the perceived position of moving objects apparently produces the visual depth effect.

U.S. Pat. No. 4,705,371 to Beard is also based on the basic Pulfrich Effect. Observers wear another type of special lenses. The lenses are intended to reduce the dead eye effect.

U.S. Pat. No. 4,836,647 to Beard discloses alternative colored filters to product the basic Pulfrich Effect. The colored lenses were designed to reduce the light from television displays more than the light from normal room lighting. The colored lenses were intended to reduce the dead eye effect.

The four methods above (U.S. Pat. Nos. 3,445,153; 4,131,342; 4,705,371; and 4,836,647) are all limited by the uni-directional nature of the motion sensitive depth effect. They are all also somewhat prone to the dead eye effect.

U.S. Pat. No. 5,751,397 to Osgood teaches a means to produce a bi-directional basic Pulfrich like effect. U.S. Pat. No. 5,751,397 uses objects moving laterally against colored stationary backgrounds or surrounds, laterally moving colored objects, and colored viewing glasses. The left lens of the viewing glasses passes from 4 to 20 times as much light of one color (e.g. red) as the right lens. The right lens of the viewing glasses passes from 4 to 20 times as much light of another color (e.g. green). Objects moving laterally against surrounds of the first color, and laterally moving objects of the first color, appear closer to the observer when they move from left to right and farther away from the observer when they move from right to left. Objects moving laterally against surrounds of the second color, and laterally moving objects of the second color, appear closer to the observer when they move from right to left and farther away from the observer when they move from left to right. The methods of U.S. Pat. No. 5,751,397 allow each eye to receive enough light over time to reduce or even totally avoid the dead eye effect.

With viewing lens that pass at most 20 times as much light of a first color as of a second color, the depth effects are weak unless large areas of saturated color are used in the laterally moving objects or in the backgrounds. Thus, in practical applications such as movies or video games, restricting the color selectivity of the viewing lens to those lens that pass from 4 to 20 times as much light of a first color as of a second color requires that large areas of saturated colors be used for the colored laterally moving objects and/or the backgrounds.

SUMMARY OF THE INVENTION

The current invention relates generally to methods for using laterally moving objects and laterally moving backgrounds to create the perception of depth when the laterally moving objects and laterally moving backgrounds are viewed with viewer glasses having colored lens or filters. The filter for the left eye is of a different color than the filter for the right eye. In a first aspect, the current invention relates to methods for using laterally moving objects and laterally moving backgrounds in colored live scenes to create the perception of depth when the scenes are viewed with viewer glasses having colored lens or filters. In a second aspect, the current invention relates to methods for using laterally moving objects and laterally moving backgrounds in colored imagery to create the perception of depth when the imagery is viewed with viewer glasses having colored lens or filters. In a third aspect, the current invention relates to colored imagery comprising laterally moving objects and laterally moving backgrounds to create the perception of depth when the imagery is viewed with viewer glasses having colored lens or filters. In a fourth aspect, the current invention relates to computer processes for operating a data processor with a visual display to create the perception of visual depth when the visual display is viewed with viewer glasses having colored lens or filters. The data processor generates colored imagery comprising laterally moving objects and laterally moving backgrounds on the visual display to create the perception of depth.

The first object of the invention is to provide methods for using colored live scenes, such as stage productions, with laterally moving backgrounds to create the perception that stationary objects are either closer to or farther away from the observer than the background. The invention teaches that in colored live scenes that appear brighter to the left eye than the right eye, backgrounds which move right to left create the perception that stationary objects are closer to the observer than the moving backgrounds. Furthermore, in colored live scenes that appear brighter to the left eye than the right eye, backgrounds which move left to right create the perception that stationary objects are farther from the observer than the moving backgrounds. Conversely, in colored live scenes that appear brighter to the right eye than the left eye, backgrounds which move left to right create the perception that stationary objects are closer to the observer than the moving backgrounds. Furthermore, in colored live scenes that appear brighter to the right eye than the left eye, backgrounds which move right to left create the perception that stationary objects are farther from the observer than the moving backgrounds.

The second object of the invention is to provide methods for using either less saturated colors, or smaller areas of saturated colors, to produce strong visual depth effects for laterally moving objects than the large areas of saturated colors required by U.S. Pat. No. 5,751,397. The first embodiment of the current invention provides viewer glasses that accomplish this objective. The viewer glasses consist of a viewer filter for the left eye that passes more than 20 times as much light of a first color than the viewer filter for the right eye, and a viewer filter for the right eye that passes more than 20 times as much light of a second color as the viewer filter for the left eye. These viewer glasses provide stronger depth effects with colored imagery that is not saturated than the depth effects provided by the viewer glasses of U.S. Pat. No. 5,751,397. The viewer glasses of the current invention also provide stronger depth effects with small areas of saturated colors than the depth effects provided by the viewer glasses of U.S. Pat. No. 5,751,397.

A third object of the invention is to provide methods for using colored imagery with laterally moving backgrounds to create the perception that stationary objects are either closer to or farther away from the observer than the background. The invention teaches that in colored imagery that appears brighter to the left eye than the right eye, backgrounds which move right to left create the perception that stationary objects are closer to the observer than the moving backgrounds. Furthermore, in colored imagery that appears brighter to the left eye than the right eye, backgrounds which move left to right create the perception that stationary objects are farther from the observer than the moving backgrounds. Conversely, in colored imagery that appears brighter to the right eye than the left eye, backgrounds which move left to right create the perception that stationary objects are closer to the observer than the moving backgrounds. Furthermore, in colored imagery that appears brighter to the right eye than the left eye, backgrounds which move right to left create the perception that stationary objects are farther from the observer than the moving backgrounds.

A fourth object of the invention is to provide colored imagery comprising laterally moving objects and laterally moving backgrounds to create visual depth effects. The invention teaches the properties of laterally moving objects and laterally moving backgrounds in colored imagery that create visual depth effects. The visual depth effects are observed by an observer wearing viewer glasses having a filter for the left eye than a the filter for the right eye.

A fifth object of the invention is to provide a process of operating a data processor with a visual display to generate colored imagery with laterally moving objects and laterally moving backgrounds on the visual display to create visual depth effects. The invention teaches processes of operating a data processor to create visual depth effects by producing colored imagery with laterally moving objects and laterally moving backgrounds on the visual display. The visual depth effects are observed by an observer wearing viewer glasses having a filter for the left eye than a the filter for the right eye.

The methods may be used for live scenes such a stage productions, motion picture films, video tapes and other types of media. The imagery can be displayed on movie screens, video displays (television, computer displays, video games, etc.) and other types of devices. The computer processes can be used with computer screen savers, video games, and other types of systems that generate imagery in real time.

BRIEF DESCRIPTION OF THE FIGURES

FIG. 1 shows three blue-green filters that attenuate red light. The high selectivity blue-green filter 21 represents filters that block or attenuate red light at least 20 times more than they attenuate green light. The intermediate selectivity blue-green filter 22 represents filters that attenuate red light at least 4 times, but not more than 20 times, as much as they attenuate green light. The low selectivity blue-green filter 23 represents filters that block or attenuate red light up to 4 times as much as they attenuate green light.

FIG. 2 shows three magenta filters that attenuate green light. The high selectivity magenta filter 24 represents filters that block or attenuate green light at least 20 times more than they attenuate red light. The intermediate selectivity magenta filter 25 represents filters that attenuate green light at least 4 times, but not more than 20 times, as much as they attenuate red light. The low selectivity magenta filter 26 represents filters that block or attenuate green light up to 4 times as much as they attenuate red light.

FIG. 6 shows the visual depth effect for an observer viewing a green scene with a laterally moving object and a stationary background. The object is moving from left to right from the observer's perspective.

FIG. 7 shows the visual depth effect for an observer viewing a green scene with a laterally moving object and a stationary background. The object is moving from right to left from the observer's perspective.

FIG. 8 shows the visual depth effect for an observer viewing a red scene with a laterally moving object and a stationary background. The object is moving from right to left from the observer's perspective.

FIG. 9 shows the visual depth effect for an observer viewing a red scene with a laterally moving object and a stationary background. The object is moving from right to left from the observer's perspective.

FIG. 10 shows the visual depth effect for an observer viewing a green scene with a laterally moving background and stationary object. The background is moving from left to right from the observer's perspective.

FIG. 11 shows the visual depth effect for an observer viewing a green scene with a laterally moving background and a stationary object. The background is moving from right to left from the observer's perspective.

FIG. 12 shows the visual depth effect for an observer viewing a red scene with a laterally moving background and a stationary object. The background is moving from right to left from the observer's perspective.

FIG. 13 shows the visual depth effect for an observer viewing a red scene with a laterally moving background and a stationary object. The background is moving from left to right from the observer's perspective.

REFERENCE NUMERALS IN FIGURES

21—High selectivity blue-green filter that passes as least 20 times as much green light as red light
22—Intermediate selectivity blue-green filter that passes from 4 to 20 times as much green light as red light
23—Low selectivity blue-green filter that passes less than 4 times as much green light as red light
24—High selectivity magenta filter that passes as least 20 times as much red light as green light
25—Intermediate selectivity magenta filter that passes from 4 to 20 times as much red light as green light
26—Low selectivity magenta filter that passes less than 4 times as much red light as green light
31—Time periods
32—Percent of green light in scene
33—Percent of red light in scene
41—Viewing glasses with colored viewing filters
42—Magenta viewing filter for right eye
43—Blue-green viewing filter for left eye
51—Current position of laterally moving object
51'—Earlier position of laterally moving object
52—Stationary background
53—Perceived location of laterally moving object 51 in front of actual location
54—Perceived location of laterally moving object 51 behind actual location
61—Stationary object
62—Current position of laterally moving background
62'—Earlier position of laterally moving background
63—Perceived location of laterally moving background 62 in front of actual location
64—Perceived location of laterally moving background 62 behind actual location

DETAILED DESCRIPTION OF THE INVENTION

Reference is now made to the drawings wherein like parts are designated with like numerals throughout. The current invention uses moving objects and backgrounds of a first color and moving objects and backgrounds of a second color to produce visual depth effects when the laterally moving objects and laterally moving backgrounds are observed with viewer glasses which transmit more of the first color to the left eye and more of the second color to the right eye. The visual depth effects disclosed in the current invention will be referred to as color and motion based depth effects.

Preferred Embodiment Colors

Figure 1:
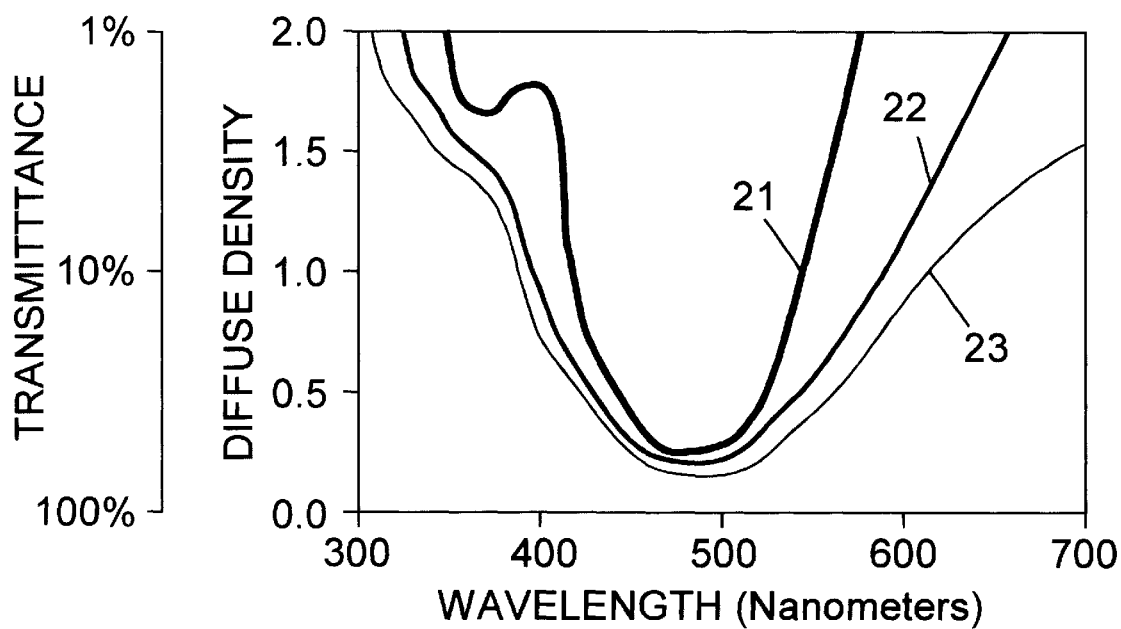
FIGS. 1 and 2 are graphs of colored filters with different levels of diffuse densities for selected wavelengths of light.
Figure 2:
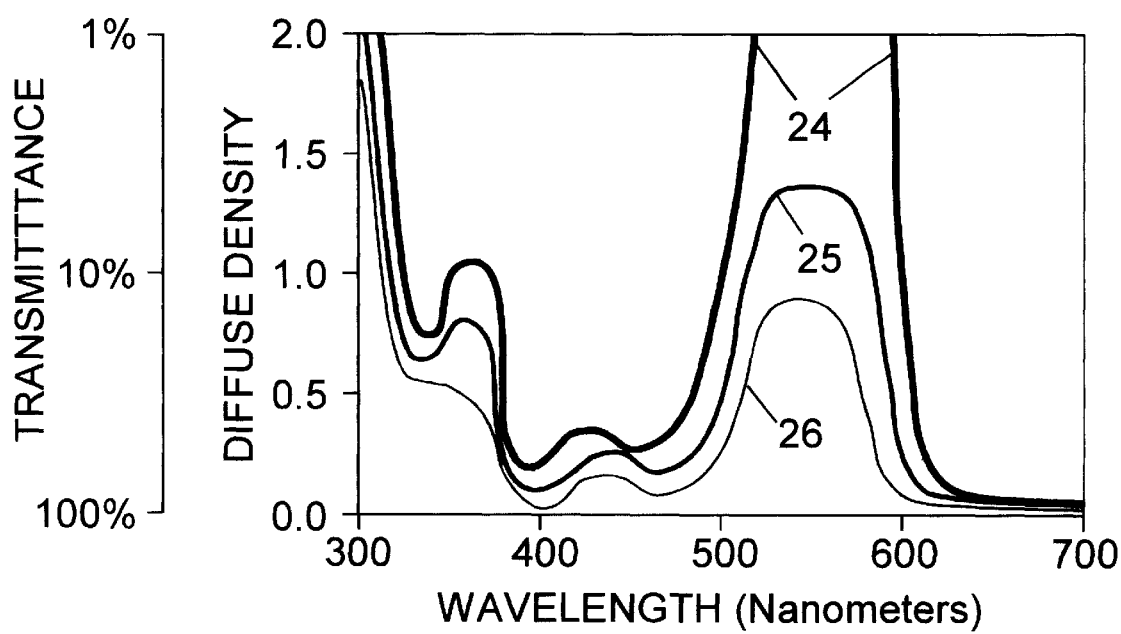

The preferred embodiment of the current invention uses green for the first color and red for the second color. FIG. 1 illustrates the light transmission properties of blue-green light filters which may be used for the left eye of the viewer glasses. FIG. 2 illustrates the light transmission properties of magenta light filters which may be used for the right eye of the view glasses. The horizontal axes in FIGS. 1 and 2 are labeled in terms of the wave length of light transmitted by a light filter. The vertical axes are labeled in terms of light transmittance (the amount of light that is transmitted through a filter). The vertical axes are also labeled in terms of the diffuse density of the light filters.

FIG. 1 illustrates the light transmittance by wavelength for blue-green filters which transmit, or pass, more green light (in the range of approximately 540 nm) than red light (in the range of approximately 610 nm). The blue-green filters also pass more blue light (in the range of approximately 435 nm) than red light. The high selectivity blue-green filter 21 represents a blue-green filter that passes at least 20 times as much green light as red light. The intermediate selectivity blue-green filter 22 represents a blue-green filter that passes from 4 to 20 times as much green light as red light. The low selectivity blue-green filter 23 represents a blue-green filter that passes up to 4 times as much green light as red light.

FIG. 2 illustrates the light transmittance by wavelength for magenta filters which transmit, or pass, more red light than green light. The magenta filters also pass more blue light than green light. The high selectivity magenta filter 24 represents a magenta filter that passes at least 20 times as much red light as green light. The intermediate selectivity magenta filter 25 represents a magenta filter that passes from 4 to 20 times as much red light as green light. The low selectivity magenta filter 23 represents a magenta filter that passes up to 4 times as much red light as green light. All of the filters shown in FIGS. 1 and 2 pass blue light.

Figure 3:
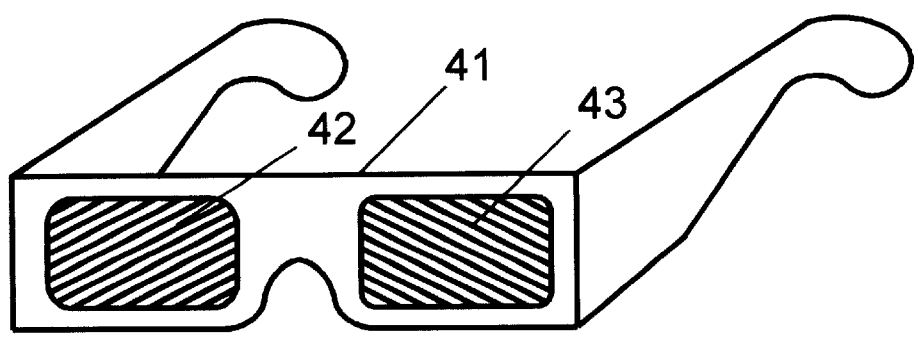
FIG. 3 is an illustration of colored viewing glasses for the preferred embodiment wherein the viewing filter for the left eye passes more green light than the viewing filter for the right eye, and the viewing filter for the right eye passes more red light than the viewing filter for the left eye.
Figure 4:
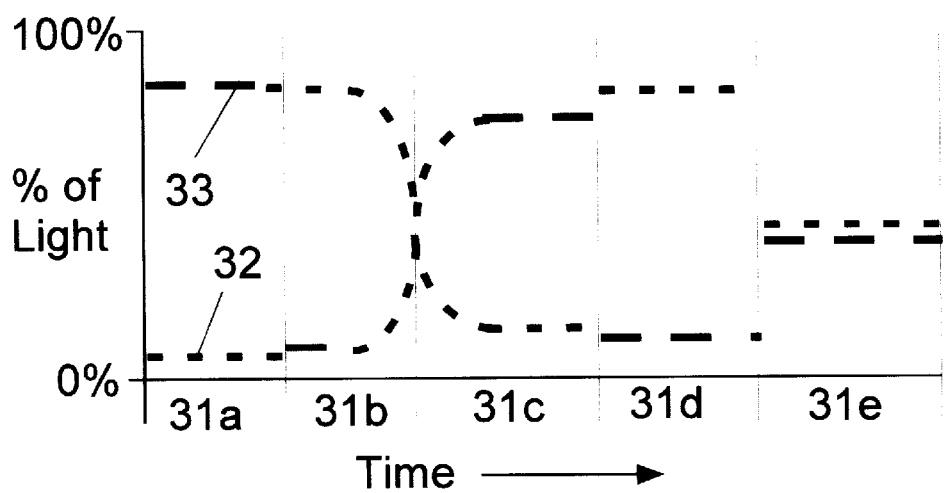
FIG. 4 shows a representative timeline for using red and green scenes comprising laterally moving objects and laterally moving backgrounds to produce depth effects when the scenes are viewed with the viewing glasses of the current invention.

The blue-green and magenta filters of FIGS. 1 and 2 are used in viewing glasses 41 of the preferred embodiment of the current invention as shown in FIG. 3. The colored viewing filter for the left eye 43 is a blue-green filter which passes more than 20 times as much green light as red light. The colored viewing filter for the right eye 42 is a magenta filter which passes more than 20 times as much red light as green light. Green objects and backgrounds appear brighter to the left eye than to the right eye of an observer wearing the viewing glasses of the preferred embodiment. The observer will perceive visual depth effects in predominately green imagery with laterally moving objects and/or laterally moving backgrounds. Red objects and background appear brighter to the right eye than to the left eye of an observer wearing the viewing glasses of the preferred embodiment. The observer will perceive different visual depth effects in predominately red imagery with laterally moving objects and/or laterally moving backgrounds. The observed visual depth effects will be described in detail below. FIG. 4 which illustrates how to use red and green imagery over time will be discussed below.

Colors that appear approximately equally bright to the left eye as to the right eye of an observer wearing the viewing glasses of the preferred embodiment are referred to as neutral colors. Neutral colors include white, shades of gray, black, blue and yellow (red and green combined). Laterally moving objects and/or laterally moving backgrounds of neutral colors do not contribute to the visual depth effects.

Mechanics of the Preferred Embodiment

The mechanics of the preferred embodiment for producing visual depth effects are illustrated by FIGS. 5 through 13. The laterally moving objects and laterally moving backgrounds of FIGS. 5 through 13 are shown as they would appear in a live scene such as stage productions; visual imagery such as movie film; or on a visual display such as a movie screen, computer display or television screen.

Figure 5:
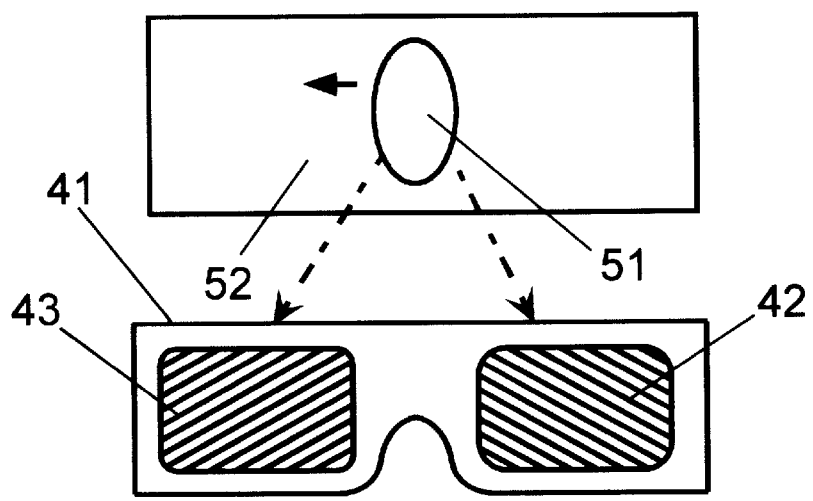
FIG. 5 shows that colored viewing glasses do not produce visual depth effects when an observer views laterally moving objects and backgrounds of neutral colors which pass approximately the same amount of light to the left eye as to the right eye.

FIG. 5 shows the viewing glasses 41 of the preferred embodiment with a magenta lens for the right eye 42 and a blue-green lens for the left eye 43. The blue-green lens for the left eye 43 passes more than 20 times as much green light (light in the range of approximately 540 nm) as the magenta lens for the right eye 42. The magenta lens for the right eye 42 passes more than 20 times as much red light (light in the range of approximately 610 nm) as the blue-green lens for the left eye 43. The left lens and the right lens both pass approximately the same amount of blue light (light in the range of approximately 435 nm).

FIG. 5 also shows a scene comprising a neutral colored laterally moving object 51 and a neutral colored stationary background 52. The viewing glasses, as well as, the moving object 51 and the stationary background 52 are shown from the viewers perspective. The neutral colors may be any or all colors that appear approximately equally bright to an observer wearing the viewing glasses of the preferred embodiment. Neutral colors include white, shades of gray, black, blue and yellow (red and green combined). Approximately the same amount of light is transmitted by the laterally moving object to an observer's right eye as to an observer's left eye. Likewise, approximately the same amount of light is transmitted by the stationary background to an observer's right eyes as to an observer's left eye. The laterally moving object and the stationary background appear equally bright to both the right eye and the left eye of the observer. In the condition shown in FIG. 5 the viewing glasses do not produce a visual depth effect for the laterally moving object or background.

Laterally Moving Objects and Stationary Backgrounds

Figure 6:
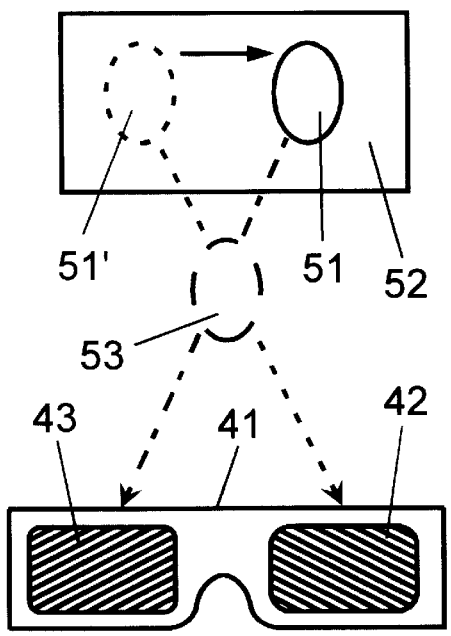
FIGS. 6 through 9 show visual depth effects manifested to an observer wearing the colored viewing glasses while observing scenes comprising laterally moving objects.

FIG. 6 shows a visual depth effect produced when an observer wearing the glasses 41 of the preferred embodiment views a predominately green scene with a laterally moving object. The laterally moving object 51 and/or the stationary background 52 may be predominately green. The laterally moving object 51 and/or the stationary background 52 appear brighter to the left eye than the right eye. The object moves laterally from left to right from the observer's perspective. The left eye sees the laterally moving object in its present position 51. The right eye sees the object in a position 51' where it was a short period of time earlier. Position 51' is to the left of position 51. The observer's visual system combines the image seen by the left eye 51 with the image seen at the same time by the right eye 51' to produce a perceived image 53. The perceived location 53 of the laterally moving object 51 is in front of the object's actual location. This produces a visual depth effect.

When the scene is displayed on a two dimensional visual display the actual location of the laterally moving object 51 is on the display surface. The perceived location of the laterally moving object 54 is in front of the display surface.

Figure 7:
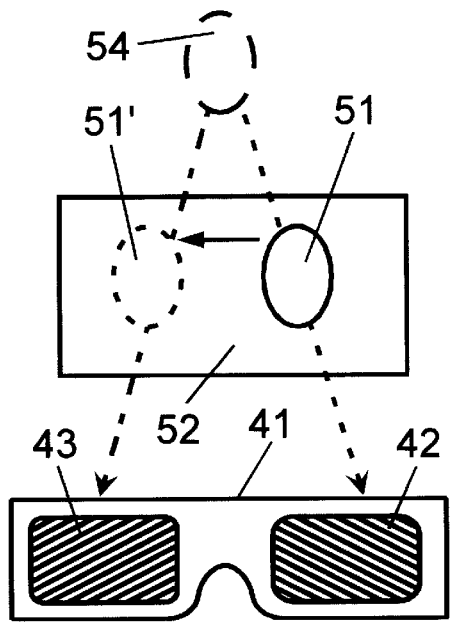

FIG. 7 shows the visual depth effect produced when a laterally moving object 51 in a predominately green scene moves from right to left. This produces a visual depth effect which is opposite to the effect produced in FIG. 6. Now the position 51' where the right eye sees the object is to the right of the position 51 where the left eye sees the object. The laterally moving object is perceived to be at a location 54 behind the object's actual location.

When the scene is displayed on a two dimensional visual display the actual location of the laterally moving object 51 is on the display surface. The perceived location 54 of the laterally moving object is behind the display surface.

Figure 8:
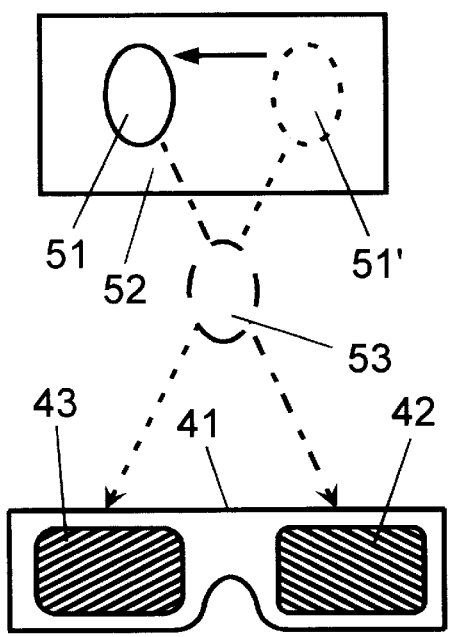

FIG. 8 shows a visual depth effect produced when an observer wearing the glasses 41 of the preferred embodiment views predominately red scene with a laterally moving object. The laterally moving object 51 and/or the stationary background 52 may be predominately red. The laterally moving object 51 and/or the stationary background 52 appear brighter to the right eye than the left eye. The object moves laterally from right to left from the observer's perspective. This produces a visual depth effect which is similar to the visual depth effect produced in FIG. 6. The right eye sees the laterally moving object in its present position 51. The left eye sees the object in a position 51' where it was a short period of time earlier. Position 51' is to the right of position 51. The observer's visual system combines the image seen by the right eye 51 with the image seen at the same time by the left eye 51' to produce a perceived image 53. The perceived location 53 of the laterally moving object 51 is in front of the object's actual location.

Figure 9:
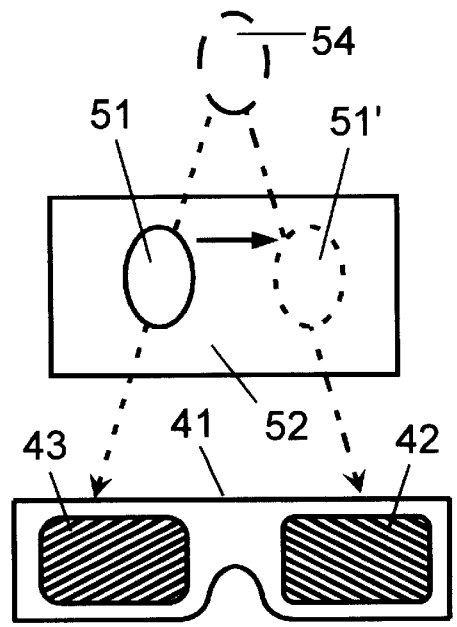

FIG. 9 shows the visual depth effect produced when a laterally moving object in a predominately red scene 51 moves from left to right. This produces a visual depth effect which is opposite to the effect produced in FIG. 8. The visual depth effect is similar to the visual depth effect produced in FIG. 7. Now the position 51' where the left eye sees the object is to the left of the position 51 where the right eye sees the object. The laterally moving object is perceived to be at a location 54 behind the object's actual location.

Laterally Moving Backgrounds and Stationary Objects

In FIGS. 6 through 9 the scene backgrounds are stationary and the objects move laterally to produce the visual depth effects. Visual depth effects can also be produced with laterally moving backgrounds and stationary objects. FIGS. 10 through 13 describe visual depth effects produced with laterally moving backgrounds and stationary objects.

Figure 10:
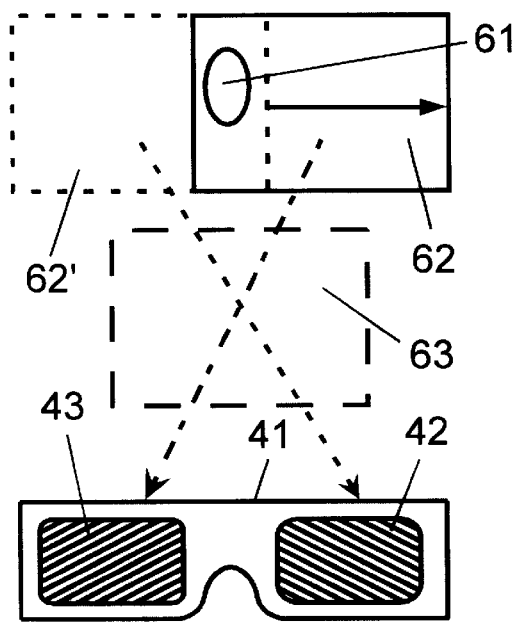
FIGS. 10 through 13 show visual depth effects manifested to an observer wearing the colored viewing glasses while observing scenes comprising laterally moving backgrounds.

FIG. 10 shows a visual depth effect produced when the observer wearing the glasses 41 of the preferred embodiment views a predominately green scene with a laterally moving background. The stationary object 61 and/or the laterally moving background 62 may be predominately green. The stationary object 61 and/or the laterally moving background 62 appear brighter to the left eye than the right eye. The background moves laterally from left to right from the observer's perspective. The left eye sees the laterally moving background in its present position 62. The right eye sees the background in a position 62' where it was a short period of time earlier. Position 62' is to the left of position 62. The observer's visual system combines the image seen by the left eye 62 with the image seen at the same time by the right eye 62' to produce a perceived image 63. This produces a visual depth effect. The perceived location 63 of the laterally moving background 62 is in front of the background's actual location. The perceived location of the stationary object 61 is in the object's actual location. The stationary object 61 is perceived as being behind the perceived location of the laterally moving background 63.

When the scene is displayed on a two dimensional visual display the actual location of the laterally moving background 61 is on the display surface. The perceived location 63 of the laterally moving background is in front of the display surface.

Figure 11:
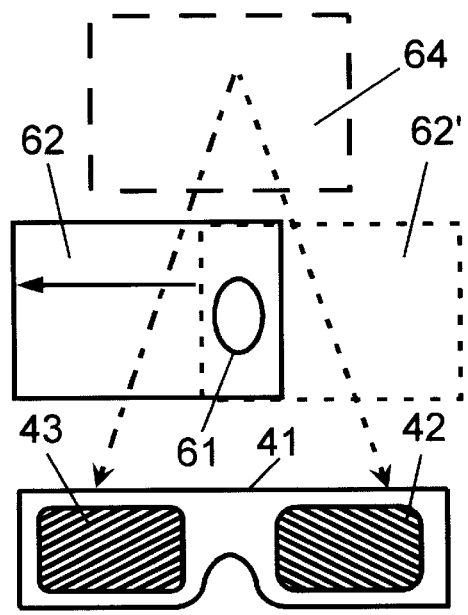

FIG. 11 shows the visual depth effect produced when a laterally moving background 62 in the predominately green scene moves from right to left. This produces a visual depth effect which is opposite to the effect produced in FIG. 10. Now the position 62' where the right eye sees the background is to the right of the position 62 where the left eye sees the background. The perceived location 64 of the laterally moving background 62 is behind the background's actual location. The perceived location of the stationary object 61 is in the object's actual location. The stationary object 61 is perceived as being in front of the perceived location of the laterally moving background 64.

When the scene is displayed on a two dimensional visual display the actual location of the laterally moving background 61 is on the display surface. The perceived location 64 of the laterally moving background is behind the display surface.

Figure 12:
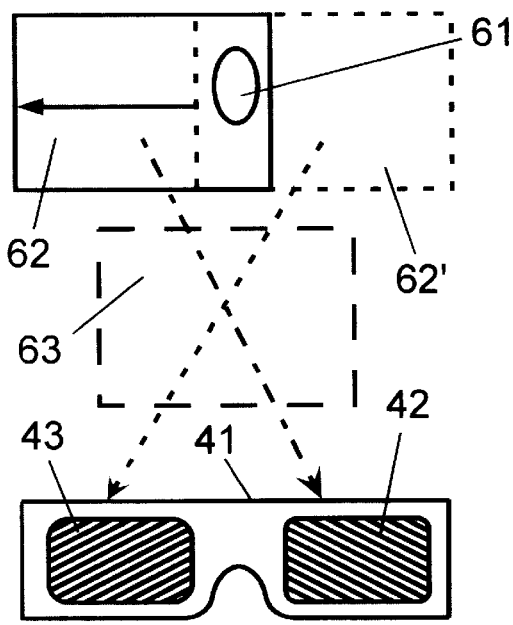

FIG. 12 shows a visual depth effect produced when the observer wearing the glasses 41 of the preferred embodiment views a predominately red scene with a laterally moving background. The stationary object 61 and/or the laterally moving background 62 may be predominately red. The stationary object 61 and/or the laterally moving background 62 appear brighter to the right eye than the left eye. The background moves laterally from left to right from the observer's perspective. This produces a visual depth effect which is similar to the depth effect produced in FIG. 10. The right eye sees the laterally moving background in its present position 62. The left eye sees the background in a position 62' where it was a short period of time earlier. Position 62' is to the right of position 62. The observer's visual system combines the image seen by the right eye 62 with the image seen at the same time by the left eye 62' to produce a perceived image 63. The perceived location 63 of the laterally moving background 62 is in front of the background's actual location. The perceived location of the stationary object 61 is in the object's actual location. The stationary object 61 is perceived as being behind the perceived location of the laterally moving background 63.

Figure 13:
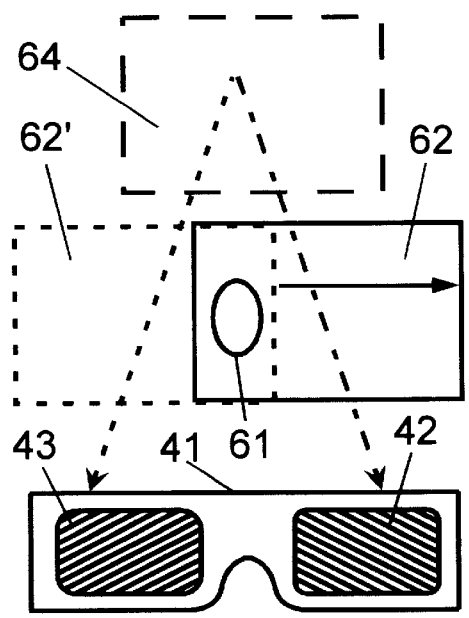

FIG. 13 shows the visual depth effect produced when a laterally moving background 62 in the predominately red scene moves from left to right. This produces a visual depth effect which is opposite to the effect produced in FIG. 12. The visual depth effect is similar to the visual depth effect produced in FIG. 11. Now the position 62' where the left eye sees the background is to the left of the position 62 where the right eye sees the background. The perceived location 64 of the laterally moving background 62 is behind the background's actual location. The perceived location of the stationary object 61 is in the object's actual location. The stationary object 61 is perceived as being in front of the perceived location of the laterally moving background 64.

Central characters and figures in stage productions, movie films, video games, etc. are often basically laterally stationary in a scene. The mechanics illustrated in FIGS. 10 through 13 provide for visual depth effects for characters and figures that are basically laterally stationary in a scene.

Controlling the Dead Eye Effect

Observing scenes which appear substantially brighter to one eye than to the other eye for more than a few minutes straight can cause eye irritation commonly called the dead eye effect. Methods for controlling the dead eye effect by alternating between green, red and neutral scenes over time are shown in FIG. 4. The horizontal axis of FIG. 4 shows the passage of time. Successive time period are shown by intervals 31a, 31b, 31c, 31d, and 31e. The vertical axis of FIG. 4 shows the approximate percent of light in a scene of a particular color. The line of short dashes 32 shows the approximate percent of light in the scene that is green. The line of long dashes 33 shows the approximate percent of light in the scenes that is red.

In interval 31a a high percentage of the light in the scene is red. The high percentage of red light may be achieved in several ways. 1. Large saturated red objects may be used with very dark or black backgrounds. 2. Dark or black objects may be used with saturated red backgrounds. 3. Large saturated red objects may be used with saturated red backgrounds.

The color of the scene changes abruptly to a high percentage of green at the beginning of interval 31b. The high percentage of green light may be achieved in several ways. 1. Large saturated green objects may be used with very dark or black backgrounds. 2. Dark or black objects may be used with saturated green backgrounds. 3. Large saturated green objects may be used with saturated green backgrounds.

The predominate color in the scene gradually changes back to red in the transition period from 31b to 31c. During interval 31c the percentage of red light in the scene is less than the percentage of red light during interval 31a. The reduction in the percentage of red light relative to 31a may be achieved in several ways. 1. Less saturated reds may be used for the objects. 2. Less saturated reds may be used for the backgrounds. 3. Small red objects may be used with neutral colored backgrounds such as gray, blue or yellow.

The color of the scene changes to green again for interval 31d. During interval 31d the percentage of green light in the scene is less than the percentage of green light during interval 31b. The reduction in the percentage of green light relative to 31b may be achieved in several ways. 1. Less saturated greens may be used for the objects. 2. Less saturated greens may be used for the backgrounds. 3. Small green objects may be used with neutral colored backgrounds such as gray, blue or yellow.

Finally the color of the scene changes to approximately equal amounts of red and green for period 31e. This may be achieved in several ways. 1. Both red and green objects may be used with neutral colored backgrounds. 2. Neutral colored objects may be used with very dark or black backgrounds. 3. Neutral colored objects may be used with neutral colored backgrounds.

U.S. Pat. No. 5,751,397 taught methods of using colored viewing filters and colored laterally moving objects and stationary backgrounds to produce visual depth effects in imagery. The viewing glasses of U.S. Pat. No. 5,751,397 pass from 4 to 20 times as much light of a first color to the left eye than the right eye and 4 to 20 times as much light of a second color to the right eye than the left eye. The viewing glasses of U.S. Pat. No. 5,751,397 produce large depth effects during intervals 31a and 31b when imagery with saturated colors is used to create the depth effects. The viewing glasses of U.S. Pat. No. 5,751,397 produce only small depth effects during intervals 31c, 31d and 31e when the colors in the imagery are less saturated. The viewing glasses of the preferred embodiment of the current invention pass more than 20 times as much green light to the left eye than to the right eye and more than 20 times as much as red light to the right eye than to the left eye. The viewing glasses of the preferred embodiment of the current invention can produce stronger depth effects during intervals 31c, 31d and 31e than the viewing glasses of U.S. Pat. No. 5,751,397. The viewing glasses of the preferred embodiment of the current invention allow for more flexibility in the color saturation of the imagery than do the viewing glasses of U.S. Pat. No. 5,751,397.

The time phasing of colors as illustrated in FIG. 4 may be used for live scenes such as stage productions including plays, dances and other routines. The resulting live scenes will consist of segments of differing percentages of red and green light. Likewise, the time phasing of colors as illustrated in FIG. 4 may be used in producing or recording imagery such as movie films, video tapes and digital video disc (DVD). The resulting recorded imagery will consist of segments of differing percentages of red and green light. Furthermore, the time phasing of colors as illustrated in FIG. 4 may be used by a data processor of known type such as a video game machine or a computer to generate imagery on a visual display in real time. The resultant imagery generated on the visual display in real time will consist of segments of differing percentages of red and green light.

Multiple Lateral Motion Depth Effects

Combinations of visual depth effects described in FIGS. 6 through 13 can be used together to enhance the perception of depth or to produce special effects. FIGS. 6 through 9 each illustrate only a single laterally moving object. Multiple laterally moving objects can be used together to enhance the overall perception of visual depth.

Predominately green scenes can contain both objects moving laterally from left to right as shown in FIG. 6 and objects moving laterally from right to left as shown in FIG. 7. The objects moving left to right appear to be closer to the observer than their actual location. The objects moving right to left appear to be farther away from the observer than their actual location. These two visual depth effects combine to produce a perception of greater depth between the objects moving left to right and those objects moving right to left. Likewise, predominately red scenes can contain both backgrounds moving laterally from left to right as shown in FIG. 12 and objects moving laterally from right to left. The background moving left to right appears to be farther away from the observer than its actual location. The objects moving from right to left appear to be closer to the observer than their actual location. These two visual depth effects combine to produce a perception of greater depth between the background moving left to right and the objects moving right to left.

Green objects moving laterally from left to right against a red background produce antagonistic visual depth effects. The green in the objects produces a visual depth effects as shown in FIG. 6 whereby the laterally moving object tends to be perceived as in front of their actual location. The red in the background produces visual depth effects as shown in FIG. 9, whereby the laterally moving objects tend to be perceived as behind their actual location. If the visual depths effects produced by the red background are substantially stronger than the visual depth effects produced by the green objects, the visual depth effects of the red background will dominate. This happens for example when a few small green objects move laterally against a large saturated red background. In contrast, if the many large saturated green objects move laterally against an unsaturated red (pink) background, the visual depth effects produced by the green objects will dominate.

If many saturated green objects move laterally against a saturated red background, the visual depth effects may be unstable. Sometimes the depth effects cancel out, and no detectable depth effects are observed. Other times domination of depth effects are unstable over time. The depth effects produced by the red background may dominate for a while and then the depth effects produced by the green objects may dominate. In addition the perceived colors of the objects and backgrounds may be unstable.

Simultaneous Red Imagery and Green Imagery

The imagery color that produces the visual depth effects described in FIGS. 6 through 13 can be produced by imagery color that is restricted to only a portion of the overall scene. For example, the scene may be predominately green in the upper portion of the overall scene and predominately red in the lower portion of the scene. The predominately green upper portion of the scene will produce visual depth effects as shown in FIGS. 6, 8, 10 and 12. The predominately red lower portion of the scene will produce visual depth effects as shown in FIGS. 7, 9, 11 and 13.

Combination with Other Depth Effects

Many different cues contribute to overall visual depth effects. The apparent size of objects and backgrounds, the relative brightness of objects and background, the clarity of objects and backgrounds, interpolation of objects, etc. all produce cues to visual depth. The lateral motion based visual depth effects disclosed in the present invention may be combined with other types of depth cues.

If the lateral motion depth effects are synergistic with the other depth effects, the overall perception of visual depth is enhanced. In green scenes containing large objects moving laterally from left to right and small objects moving laterally from right to left, the lateral motion depth effects and the size depth effects are synergistic. Size cues make the large objects appear closer than the small objects. The lateral motion based visual depth effects also make the large objects appear closer than the small objects. The overall perception of depth is enhanced. The large objects moving laterally appear to be in front of the small objects moving laterally. The apparent visual depth between the large objects and the small objects is greater than the apparent depth produced by either the size differential alone or the lateral motion based visual effects alone.

If the lateral motion depth effects are antagonistic with the other depth effects, the overall perception of visual depth may be unstable. In green scenes containing small objects moving laterally from left to right and large objects moving laterally from right to left, the lateral motion depth effects and the size depth effects are antagonistic. Size cues make the large objects appear closer than the small objects. The lateral motion based visual depth effects in contrast make the small objects appear closer than the large objects. The overall perception of depth may be unstable. The large objects may appear to be closer than the small objects for a while; then the small objects may appear to be closer than the large objects for a while.

Alternate Colors

The preferred embodiment uses viewing glasses with a blue-green filter for the left eye and a magenta filter for the right eye. The filter for the left eye passes more than 20 times as much green light as the filter for the right eye. The filter for the right eye passes more than 20 times as much red light as the filter for the left eye. Both lenses pass approximately the same amount of blue light. Predominately red and predominately green scenes are used with the viewing glasses of the preferred embodiment to produce visual depth effects for laterally moving objects and backgrounds.

Colored filters of lower color selectivity may be used in the viewer glasses. Intermediate selectivity filters 22 and 25 as shown in FIGS. 1 and 2 may be used to produce the visual depth effect with scenes comprising large amounts of saturated red or green with laterally moving objects and/or laterally moving backgrounds.

Filters of alternate colors can be used with scenes of alternate colors to produce visual depth effects for laterally moving objects and backgrounds. A magenta filter may be used for the left eye of the viewing glasses and a blue-green filter may be used for the right eye. This will produce visual depth effects that are opposite to those illustrated in FIGS. 5 through 13. Other combinations of colors that may be used for the filters of the viewing glasses and in the scenes include the following:

1. Red versus green
2. Red versus blue
3. Green versus blue
4. Magenta (red and blue) versus green
5. Yellow (red and green) versus blue
6. Blue-green versus red
7. Magenta versus blue-green
8. Magenta versus yellow
9. Blue-green versus yellow.

For any particular combination of colored filters in the viewing glasses scenes that appears brighter to the left eye than to the right eye will produce visual depth effects as shown in FIGS. 6, 8, 10 and 12. Scenes that appears brighter to the right eye than to the left eye will produce visual depth effects as shown in FIGS. 7, 9, 11 and 13.

Methodology

Methodology for using colored viewing filters and colored scenes containing laterally moving objects and laterally moving backgrounds to produce visual depth effects is based on the above text and figures. Mechanics of using laterally moving objects and laterally moving backgrounds in colored scenes to produce visual depth effects are shown in FIGS. 5 through 13. Properties of the viewing glasses and viewing filters are shown in FIGS. 1, 2 and 3. Time phasing for varying the colors in the scenes to avoid the dead eye effect is shown in FIG. 4. Methodology for combining multiple color and motion based depth effects, and for combining those depth effects with other depth effects is described above. Methodology for simultaneous use of red and green scenes and the use of alternate colors is described above.

Recorded Imagery

Recorded imagery such as movie film, video tapes, digital video disc (DVD) may be used to produce lateral motion based visual depth effects. The properties of imagery to be used to produce the visual depth effects is based on the above text and figures. The characteristics of laterally moving objects and laterally moving backgrounds that can be used in colored imagery are shown in FIGS. 5 through 13. Properties of the viewing glasses and viewing filters for viewing the imagery are shown in FIGS. 1, 2 and 3. Time phasing for varying the colors in the imagery to avoid the dead eye effect is shown in FIG. 4. How color and motion based depth effects that may be combined together in the imagery is described above. Other visual depth cues that may be combined with the color and motion based depth effects are described above. The simultaneous use of red and green imagery and the use of alternate colors in the imagery is described above.

Imagery Produced in Real Time

A data processor of known type such as a video game machine or a computer may be used to generate imagery on a visual display in real time to produce lateral motion based visual depth effects. The process for using the data processor and visual display to produce the visual depth effects is based on the above text and figures. The characteristics of laterally moving objects and laterally moving backgrounds that can be used in colored imagery on the visual display are shown in FIGS. 5 through 13. Properties of the viewing glasses and viewing filters for viewing the imagery on the visual display are shown in FIGS. 1, 2 and 3. Time phasing for varying the colors in the imagery on the visual display to avoid the dead eye effect is shown in FIG. 4. How to combine multiple color and motion based depth effects, and how to combine those depth effects with other depth effects in the imagery on the visual display is described above. The simultaneous use of red and green imagery and the use of alternate colors in the imagery on the visual display is described above.

I claim:

1. A method of using colored live scenes, comprising a first color and a second color, which when observed through viewer glasses provides visual depth effects for laterally moving objects, and laterally moving colored backgrounds the method comprising:

selecting a first color and a second color;

selecting as part of said live scenes laterally moving objects and backgrounds of said first color which move from left to right from the observer's perspective to create the perception of being closer to the observer, and which move from right to left to create the perception of being farther away from the observer;

selecting as part of the live scenes laterally moving objects and backgrounds of said second color which move from right to left from the observer's perspective to create the perception of being closer to the observer, and which move from left to right to create the perception of being farther away from the observer; and using viewer glasses comprising a left lens and a right lens wherein the left lens passes more light of the first color than the right lens, and the right lens passes more light of the second color than the left lens.

2. A method of using colored imagery, comprising a first color and a second color, as part of movie, video or other imagery which when observed through viewer glasses provides visual depth effects for laterally moving objects and laterally moving backgrounds, the method comprising:

selecting said first color and said second color;

selecting as part of said movie or video or other imagery laterally moving objects and backgrounds of the first color which move from left to right from the observer's perspective to create the perception of being closer to the observer, and which move from right to left to create the perception of being farther away from the observer;

selecting as part of the movie or video or other imagery laterally moving objects and backgrounds of the second color which move from right to left from the observer's perspective to create the perception of being closer to the observer, and which move from left to right to create the perception of being farther away from the observer; and using viewer glasses comprising a left lens and a right lens wherein the left lens passes more than 20 times as much light of the first color as the right lens, and the right lens passes more than 20 times as much light of the second color as the left lens.

3. Movie, video or other imagery, comprising a first color and a second color, which provides visual depth effects when observed through viewer glasses comprising a left lens and a right lens, wherein said left lens of said viewer glasses passes more light of said first color than said right lens, and said right lens passes more light of said second color than the left lens, said imagery comprising:

laterally moving objects and backgrounds of the first color which move from left to right from the observer's perspective to create the perception of being closer to the observer, and which move from right to left to create the perception of being farther away from the observer; and laterally moving objects and backgrounds of the second color which move from right to left from the observer's perspective to create the perception of being closer to the observer, and which move from left to right to create the perception of being farther away from the observer.

4. A process of operating a data processor of known type with a visual display of known type, wherein said data processor generates imagery, comprising a first color and a second color, on said visual display, said imagery provides visual depth effects when the imagery is viewed through viewer glasses comprising a left lens and a right lens, wherein said left lens of said viewer glasses passes more light of said first color than said right lens, and the right lens passes more light of said second color than the left lens, said process comprising:

selecting the first color and the second color;

the data processor producing on the visual display imagery comprising laterally moving objects and backgrounds of the first color which move from left to right from the observer's perspective to create the perception of being closer to the observer, and which move from right to left to create the perception of being farther away from the observer; and the data processor producing on the visual display imagery comprising laterally moving objects and backgrounds of the second color which move from right to left from the observer's perspective to create the perception of being closer to the observer, and which move from left to right to create the perception of being farther away from the observer.

5. Viewing glasses for creating visual depth effects when observing colored live scenes or imagery containing lateral movement, said viewing glasses comprising:

first means for transmitting light from the live scene or imagery to one eye of an observer;

second means for transmitting light from the live scene or imagery to the other eye of said observer;

the first said means for transmitting light passes at least four times as much green light with a peak transmission of 540 nm as said second light transmitting means;

the second means for transmitting light passes at least four times as much red light with a peak transmission of 610 nm as the first light transmitting means;

the first means for transmitting light and the second means for transmitting light both pass the same amount of blue light with a peak transmission of 435 nm; and means for holding the first and second light transmitting means in place in front of an observer's respective eyes.

6. Viewing glasses for creating visual depth effects when observing colored live scenes or imagery containing lateral movement, said viewing glasses comprising:

first means for transmitting light from the live scene or imagery to one eye of an observer;

second means for transmitting light from the live scene or imagery to the other eye of said observer;

the first said means for transmitting light passes at least four times as much green light with a peak transmission of 540 nm as said second light transmitting means;

the second means for transmitting light passes at least four times as much blue light with a peak transmission of 435 nm as the first light transmitting means;

the first means for transmitting light and the second means for transmitting light both pass the same amount of red light with a peak transmission of 610 nm; and means for holding the first and second light transmitting means in place in front of an observer's respective eyes.

7. Viewing glasses for creating visual depth effects when observing colored live scenes or imagery containing lateral movement, said viewing glasses comprising:

first means for transmitting light from the live scene or imagery to one eye of an observer;

second means for transmitting light from the live scene or imagery to the other eye of said observer;

the first said means for transmitting light passes at least four times as much red light with a peak transmission of 610 nm as said second light transmitting means;

the second means for transmitting light passes at least four times as much blue light with a peak transmission of 435 nm as the first light transmitting means;

the first means for transmitting light and the second means for transmitting light both pass the same amount of green light with a peak transmission of 540 nm; and means for holding the first and second light transmitting means in place in front of an observer's respective eyes.

* * * * *